United States Patent
Brocheton et al.

(10) Patent No.: US 7,316,825 B2
(45) Date of Patent: *Jan. 8, 2008

(54) FILTER AID USED IN ALLUVIATION

(75) Inventors: Sophie Brocheton, Leuven (BE); Georges Rahier, Liege (BE); Philippe Janssens, Wavre (BE); Stephane Louis Ghislain Dupire, Orp-Jauche (BE); Pierre Marie Fernand Adam, Louvain-la-Neuve (BE)

(73) Assignee: Krontec S.A. (BE)

( * ) Notice: Subject to any disclaimer, the term of this patent is extended or adjusted under 35 U.S.C. 154(b) by 355 days.

This patent is subject to a terminal disclaimer.

(21) Appl. No.: 11/090,771

(22) Filed: Mar. 25, 2005
(Under 37 CFR 1.47)

(65) Prior Publication Data

US 2005/0189285 A1  Sep. 1, 2005

Related U.S. Application Data

(63) Continuation of application No. 09/707,536, filed on Nov. 7, 2000, now Pat. No. 6,986,911, which is a continuation-in-part of application No. 08/849,621, filed on Jun. 25, 1998, now abandoned.

(30) Foreign Application Priority Data

Dec. 6, 1994 (EP) .................. 94870190

(51) Int. Cl.
*C12H 1/07* (2006.01)

(52) U.S. Cl. ...................... 426/422; 426/423

(58) Field of Classification Search ................ 426/422, 426/423; 210/369, 36
See application file for complete search history.

(56) References Cited

U.S. PATENT DOCUMENTS 4,326,964 A    4/1982   Hirs (Continued)

FOREIGN PATENT DOCUMENTS

EP    0483099 B1   4/1997

(Continued)

OTHER PUBLICATIONS

Rilsan® Polyamid Fine Powder Coating Receives NSF Certification for Use in Potable Water Systems, Philadelphia, PA; Sep. 26, 1997 at http://www.elf-atochem.com.

(Continued)

*Primary Examiner*—Keith Hendricks
*Assistant Examiner*—Vera Stulii
(74) *Attorney, Agent, or Firm*—Levy & Grandinetti

(57) ABSTRACT

A filter aid for use in connection with the filtration of liquids is provided. In particular, a filter useful in connection with the filtration of beer is provided. In addition, a method of filtering liquids is provided. According to the method, a filter aid comprising angular, isotropic particles is introduced to a liquid before the liquid is passed through a filter. In particular, a method for filtering beer comprising the introduction of angular, isotropic particles as a filter aid to a stream of unfiltered beer such that a filtration cake comprising filter aid and solids filtered from the beer is formed.

19 Claims, 2 Drawing Sheets

U.S. PATENT DOCUMENTS 5,484,620 A    1/1996    Oeschle et al.

FOREIGN PATENT DOCUMENTS

WO    WO9617923 A1    6/1996

OTHER PUBLICATIONS

PRAS; 9069 1 90 80 70; Nylons, date unknown.
MatWeb—Online Material Data Sheet, Jul. 18, 2007.
Orgasol Polyamide Powders, Arkema, 2000.
Polyamide 11 fine powder rilsan: comparison between accelerated and natural ageing, no date is available.

FILTER AID USED IN ALLUVIATION

This application is a continuation of U.S. patent application Ser. No. 09/707,536, filed on Nov. 7, 2000, now U.S. Pat. No. 6,986,911, which is a continuation-in-part of U.S. patent application Ser. No. 08/849,621, filed on Jun. 25, 1998, now abandoned, the entire disclosures of which are hereby incorporated herein by reference.

FIELD OF THE INVENTION

The present invention relates to a filter aid having improved properties, which is used in alluviation.

The present invention covers the use of this aid for filtering any unfiltered liquid, in particular beer, musts, wine or other drinks as well as food oils.

BACKGROUND OF THE INVENTION

Filter aids are divided substances which, when used in solid-liquid separations by placing them on a screen or support, either alone or as a mixture with the particles to be retained, provide or improve, by a mainly mechanical action, the efficacy of the separation.

This efficacy may be related either qualitatively to the filtrate obtained, for example its purity or its sterility, or quantitatively by the increase in the flow rate of filtrate.

The main aids used are:
diatomaceous earths obtained from the calcination of diatomites, algal fossils forming part of the plankton family and generally referred to as kieselguhr;
perlites originating from a volcanic rock, rhyolite. This crushed, ground rock is expanded more than 20 times in a calcination oven;
starch in the form, for example, of potato flour;
fly ash;
cellulose;
synthetic materials such as polymer fibers, glass beads or plastic beads, etc.

These aids form, during filtration, a porous medium which captures the impurities to be removed and facilitates the flow of the liquid phase.

It is known that these aids can be used either as a prelayer or in alluviation.

As a prelayer, the aid is placed on the filter medium prior to filtration of the suspension.

In alluviation, the aid is mixed with the suspension, prior to filtration, generally by means of a metering pump. This suspension forms a mixed cake composed of aid and impurities. It is very common to filter a suspension with alluviation on a prelayer, in order to prepare a well-clarified initial filtrate, to protect the filter medium from the migration of fine particles which could block it and to favor the dismantling and cleaning of the filtration equipment.

One particularly advantageous sector of application of aids is that of beermaking.

European patent application EP-A-0,483,099 describes a filter aid intended to be used more particularly in the technique of alluviation in the field of brewing. This aid consists of spherical beads of particle size between 5 μm and 50 μm with an average diameter close to 20 μm. These aids are preferably used in the form of cakes whose porosity is between 0.3 and 0.5. These spherical beads are incompressible beads which are resistant to abrasion and to regeneration agents, and relatively insensitive to the effects of temperature and feed quality. These are usually made of solid or hollow glass or plastic.

U.S. Pat. No. 4,326,964 describes a process of filtration on a deep bed. According to that process, the liquid filled with impurities percolates through a filter bed, thus gradually blocking it. In order to increase the duration of the cycle and to limit the blocking of the filter at the surface, it is proposed to have a bed formed of layers of different particle sizes in which the largest particles are found at the top of the bed and stop the bulkiest impurities, and the finest particles are found at the bottom of the filter, in order to trap the smallest impurities. When the bed is blocked, it is envisaged to carry out a cleaning operation which is performed by countercurrent washing at a flow rate such that a fluidization phenomenon occurs. This action causes mixing between the various layers of different particle sizes. To prevent this homogenization of the layers of different particle sizes, it is proposed to use materials whose specific masses are suitably chosen to cause segregation. In particular, the addition of hollow silica beads in cement is one means proposed to achieve this objective.

It would be advantageous to provide a filter aid intended to be used in alluviation techniques that is of improved behavior when compared with those described in the prior art, and more particularly that described in document EP-A-483,099.

It would also be advantageous to provide a filter aid that is particularly suitable for use in beermaking, and more particularly for the technique of alluviation intended for the clarification of beer. Furthermore, it would be advantageous to provide a filter aid that produced a filter cake having a reduced specific resistance, a reduced increase in pressure drop across the filter cake, and a reduced rate of filter cake growth.

SUMMARY OF THE INVENTION

The present invention relates essentially to a method for filtering an unfiltered liquid, comprising the steps of:
1. providing a filter aid,
2. adding said filter aid to said unfiltered liquid, in order to have a suspension and,
3. filtering said suspension on a filter, thereby forming on a surface of said filter, a filter cake comprising said filter aid and particles filtered from said suspension.

Preferably, said unfiltered liquid is beer, but can also be musts, wine or other drinks as well as food oils.

Said filter aid, according to the present invention, comprises a population of individual angular particles.

Said angular shape of the particle is defined by a shape factor, while the population of the individual particles is defined by a uniformity coefficient.

The shape factor is the ratio between the smallest diameter $D_{min}$ and the largest diameter $D_{max}$ of the particles, said shape factor being comprised between 0.6 and 0.85.

The uniformity coefficient is the ratio between the diameter of 80% of the particles, and the diameter of 10% of the particles, said uniformity coefficient being comprised between 1.8 and 5.

Preferably, the specific surface of the particles constituting the aid measured according to the BET method, corrected by the value of the specific mass of the filter aid is less than $10^6$ m$^2$/m$^3$.

The specific mass of the individual angular particles of said aid, should not be more than 25% greater than the specific mass of the suspension to be filtered, so that to avoid any phenomenon of settling out and segregation.

Preferably, said individual angular particles have a isotropic physical nature, i.e. that the composition of a single particle is substantially constant across said particle.

Said angular particles are preferably formed from a polymer, such as synthetic polyamide or from glass.

According to a preferred embodiment, the population of the individual angular particles is defined by a particle size distribution calculated from the volume of particles, having an average diameter from about 30 to about 40 µm, measured according to Malvern measurement method, by the fact that 70% and preferably 90% of the particles have a diameter between 15 and 50 µm.

The filter cake which comprises said filter aid and particles filtered from the suspension, being in the form of a granular medium, has a porosity comprised between 0.5 and 0.7, and a permeability greater than 0.5 Darcy (determined by measuring the specific resistance).

DETAILED DESCRIPTION OF THE INVENTION

Figure 1:
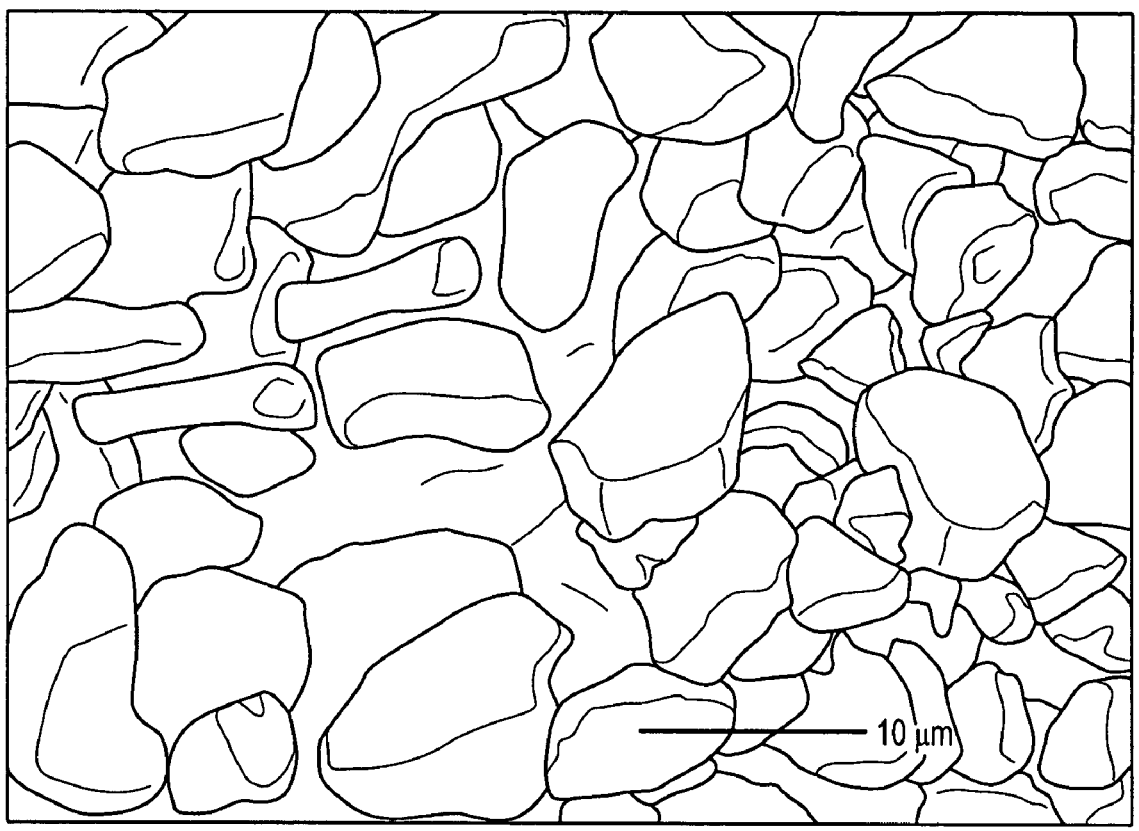
FIG. 1 is an illustration of particles in accordance with an embodiment of the present invention.

The present invention is directed to a filter aid. In particular, the present invention is directed to a filter aid for use in connection with beermaking. More particularly, the filter aid of the present invention may be added to unfiltered beer in a process of alluviation to improve the filtration of beer.

In addition, the present invention provides a method for filtering any unfiltered liquid in which a filter aid having the described characteristics is added to said liquid.

A filter cake may be formed when the particles of a filter aid are introduced to the liquid to be filtered and the resulting suspension is passed through a filter. In general, a filter cake is a porous medium comprising a plurality of particles (aid+impurities). Because the filter cake is itself permeable, liquid may flow through it. The pores formed within a filter cake are irregular, and trap suspended material, including material to be filtered from the liquid and the filter aid itself. In particular, particles accumulate on the cake, which forms on the surface of the filter. Typically, filter aid particles are added continuously to the liquid to be filtered, to maintain the porosity of the filter cake. This method of using a filter aid is known as alluviation. At some point, the pressure drop across the filter cake and the associated filter becomes too great, and/or the filter chambers become filled with the cake, and the filter must be cleared of the cake. Because cleaning the filter requires that production of the filtered liquid be stopped, it is desirable to produce a filter cake that provides the required filtration performance while limiting the increase in pressure drop across the filter cake as the filter cake grows. The use of the particles described herein as a filter aid, and in particular as a filter aid used in connection with a process of alluviation, provides these benefits.

The filter aid of the present invention may be provided in bulk as a powder (a population of small individual particles of suitable composition). Said individual particles are defined by:
- a shape factor (j) which is the ratio of the smallest Feret diameter ($D_{min}$) to the largest Feret diameter ($D_{max}$) of a particle (see also Particle Size Measurement-4$^{th}$ Edition, Terence Allen, edited by Chapman & Hall, Ltd., 1990). The shape factor is measured with an optical microscope such as described in Advanced in solid liquid separation, edited by Muralidhara (1986, Batelle Institute) or measured with an electronic microscope such as the apparatus Gemini, commercialized by the company LEO and using an analyser of image based on a software SCION. The Feret diameter is defined as the average value of diameters, measured between two parallel tangents of the projected outline of a particle (see also Transferts et Phases Dispersées of L. Evrard & M. Giot, edited by UCL).
- its specific surface ($S_0$) measured according to the Brunauer, Emmet and Teller (BET) measurement method defined in document "Powder surface area and porosity" of S. Lowell and J. Shields (edited by Chapman & Hall Ldt, 1991), and corrected by the specific mass of the filter aid (see also "Filtration Equipment Selection Modeling and Process Simulation of R. J. Wakeman and E. S. Tarleton (edited by Elsevier Advanced Technology, 1$^{st}$ edition)),
- its specific mass of the particles(Ma),
- its chemical composition,
- its physical nature.

The population of individual particles is defined by:
a uniformity coefficient which is the ratio of:
D80
D10 wherein D80 is 80% pass diameter of the particles, and D10 is 10% pass diameter of the particles, both being determined by the Malvern particle size analyse (with a laser beam, as defined in Transferts et Phases Dispersees of L. Evrard & M. Giot, edited by UCL); the pass diameter of a particle being the diameter that the specified percentage of the total sample of particles is less than or equal to, the average diameter of the particles ($D_{ave}$) calculated from the volume of the particles, measured according to the Malvern measurement method which defines an equivalent diameter.

The cake (the granular medium being obtained after filtration on a filter of the suspension (unfiltered liquid+filter aid)) is defined by:
- the specific resistance Rs, which is the resistance to the passage of the liquid through a cake of 1 kg of dry solid material deposed on 1 m$^2$ (Rs measured in m/kg),
- the apparent specific mass $M_{gs}$ (in kg/m$^3$).

These measurements will determine:
- the porosity $e_0$ calculated from the apparent specific mass (see also the definition given by Filtration Dictionary, published by Filtration Society, 1975),
- the permeability $b_0$ (in Darcy), determined by measuring the specific resistance, and the actual specific mass $M_a$, determined by pycnometry (see also Filtration Equipment Selection Modeling and Process Simulation of R. J. Wakeman and E. S. Tarleton (Elsevier Advanced Technology, 1$^{st}$ edition)).

Figure 2:
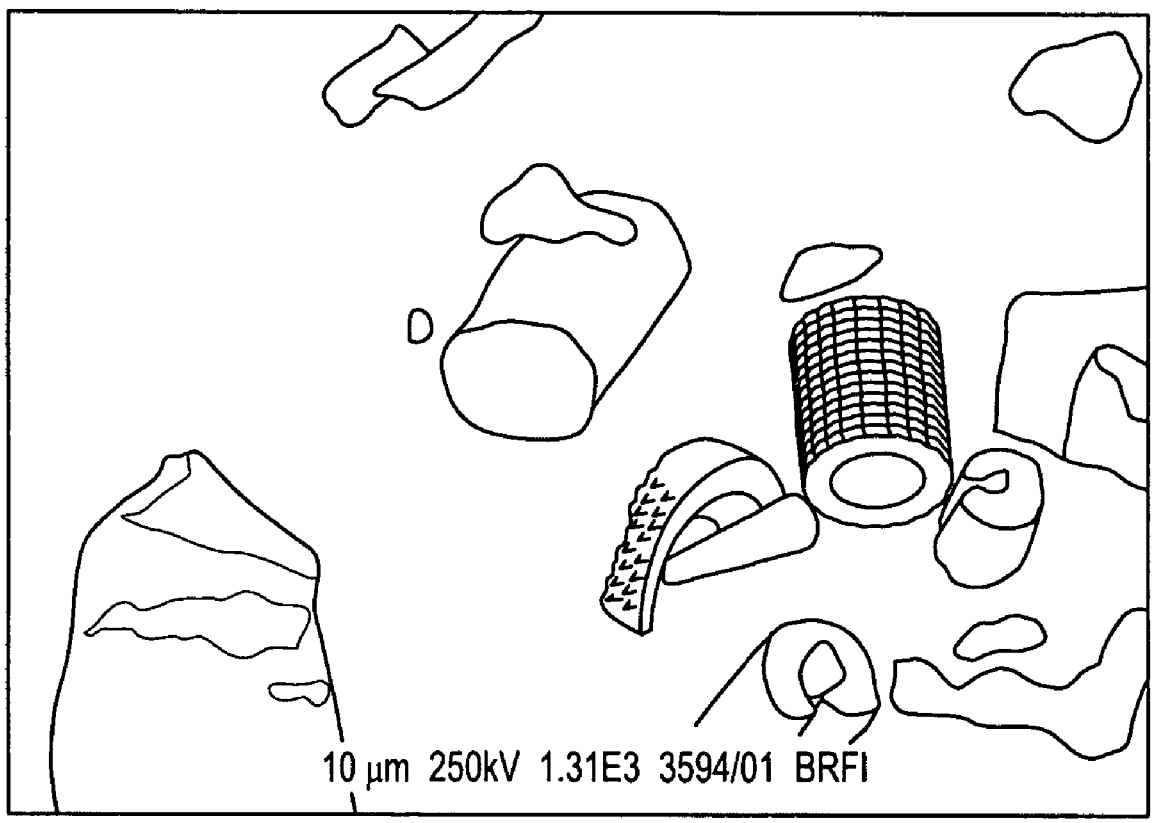
FIG. 2 is an illustration of particles in accordance with the prior art.

With reference now to FIG. 1, the angular particles according to an embodiment of the present invention are illustrated. The particles of the present invention illustrated in FIG. 1 are distinct from conventional filter aids, such as those formed from diatomaceous earth, an example of which is illustrated in FIG. 2. In addition, with continued reference to the filter aid of the present invention, as illustrated in FIG. 1, the filter aid of the present invention is distinct from filter aids that consist of spherical beads, described in EP-0883,099.

The filter aid of the present invention may comprise particles made from a polymer, glass or plastic.

In particular, the filter aid of the present invention may be produced from a nylon, such as Rilsan RS available from Atofina.

Another suitable material is a filtration aid called Orgasol 2002 ES4 Nat 3, available from Atofina. Such aid is produced from polyamid 12.

Other suitable materials include synthetic polyamides, including those sold under the trade names Nylonâ, Nylon 6â or Nylon 66â.

The noteworthy properties obtained by using an aid according to the present invention will be demonstrated by comparing filter aids such as Rilsan RS and Orgasol of the present invention with so-called standard aids (e.g. diatomaceous earths) and with an aid as described in document EP-A-0,483,099.

The so-called standard aids are diatomaceous earths which are used either in alluviation, such as pink kieselguhrs obtained by simple calcination, or as filter prelayers, such as white kieselguhrs obtained by calcination and sintering. By way of example, CBL is mentioned as a pink kieselguhr and DIF BO as a white kieselguhr, these two aids being marketed by the company CECA. These kinds of standard aids are described in details in Beer Filtration, Stabilisation and Sterilisation—EBC Manual of Good Practice (FachVerlag Hans (Nuremberg, 1991)).

Moreover, an aid as described in patent application EP-A-0,483,099 in the form of spherical beads was also used in order to carry out a comparative test with the aid according to the present invention.

Table 1 summarizes the main characteristics of the five filter aids (two aids according to the present invention compared to three standard aids).

TABLE 1

CHARACTERISTIC MAGNITUDES OF FILTER AIDS

| | $S_0$ ($m^2/m^3$) | $d_{ave}$ (m) | $d_{10}$ (m) | $d_{80}$ (m) | Shape factor | Specific Mass $M_a$ ($kg/m^3$) |
|---|---|---|---|---|---|---|
| Rilsan RS | $0.55 \times 10^6$ | 34.7 | 16.5 | 46.8 | 0.7 | 1200 |
| Orgasol | $1.03 \times 10^6$ | 39.4 | 26.4 | 48.78 | 0.84 | 1030 |
| Aid EP-0,483,099 | $1.3 \times 10^6$ | 20 | 2 | 33 | Near 1 | 2290 |
| CBL | $6.0 \times 10^6$ | 22.5 | 3.4 | 37.4 | 0.54 | 2300 |
| DIF BO | $3.5 \times 10^6$ | 29.5 | 6.5 | 45.9 | 0.57 | 2300 |

The comparative tests consist in filtering at constant pressure a concentrated suspension of aid and of yeasts, the ratio of the two constituents of which suspension remains equal to that of a beer containing $10^6$ yeasts per ml with 100 g/hl of aid added. This yeast concentration may be considered as being a maximum for a centrifuged beer.

The batchwise laboratory tests were carried out on a sample of 2 liters of beer containing $10^{11}$ yeasts with 100 g of aid added. The filtration is carried out at a pressure of 2 bar.

Table 2 essentially represents the data of specific resistance and of specific mass of the mixed media (aid+impurities) for the abovementioned five aids.

TABLE 2

SPECIFIC RESISTANCE AND SPECIFIC MASS OF MIXED MEDIA

| | $R_s$ (m/kg) | $M_{GS}$ ($kg/m^3$) | $\beta_0$ (Darcy) | $\epsilon_0$ |
|---|---|---|---|---|
| Rilsan RS | $4.0 \times 10^9$ | 480 | 1.55 | 0.61 |
| Orgasol | $4.63 \times 10^9$ | 425 | 0.55 | 0.587 |
| Aid EP-0,493,099 | $4.7 \times 10^{10}$ | 1580 | 0.05 | 0.31 |
| CBL | $6.0 \times 10^{10}$ | 293 | 0.05 | 0.86 |
| DIF BO | $7.2 \times 10^9$ | 320 | 0.55 | 0.83 |

From the data summarized in Table 2, it is seen that the two aids according to the present invention give rise, in the presence of yeasts, to cakes whose specific resistance is very much lower than those obtained with the so-called standard aids (kieselguhrs) and with the aid described in document EP-0,483,099. The apparent specific mass of the cake formed with the novel aid is higher than that measured for cakes formed with kieselguhrs, but lower than that for the cake formed by the aid described in the document EP-0,483,099. This means that the increase in pressure in the filter and the growth of the cake are considerably smaller with the aid according to the present invention than with the traditional aids. These advantages are considerable and make it possible to increase the filtration times before the maximum admissible pressure on the filter has been reached or before the filtration chambers have been filled with cake, which will maximize the useful production lifetime of the industrial filter.

According to a first embodiment of the method of the present invention, the filter aid made of Rilsan RS particles is added to a flow of liquid to be filtered as a body feed. Each particle of the filter aid has a specific surface of less than $0.55.10^6$ $m^2/m^3$, the particles have an average diameter of from about 34.7 μm. According to said embodiment of the present invention, the 10% pass diameter (D10) of the filter aid particles is about 16.5 μm and the 80% pass diameter (D80) is about 46.8 μm. The uniformity coefficient defined as the ratio between D80 and D10 is 2.83. In addition, the particles of the filter aid have a shape factor, defined as the ratio of the smallest diameter to the largest diameter of the particles, of from about 0.7. Accordingly, the particles may be characterized as angular. According to said embodiment of the present invention, the specific mass of the filter aid is about 1200 $kg/m^3$, which is 120% of the specific mass of the suspension to be filtered. In addition, the particles are isotropic.

The method of the present invention, according to said first embodiment, produces a filter cake having a specific resistance to flow that is less than the specific resistance of known filter aids, such as diatomaceous earth and spherical beads. According to said embodiment of the method of the present invention, the described filter aid is added to unfiltered beer in a process of alluviation. According to said embodiment of the present invention, the filter aid and solids filtered from beer form a filter cake having a specific resistance of about $4.0.10^9$ m/kg.

According to a second embodiment of the method of the present invention, the filter aid made of polyamide particles called Orgasol is added to a flow of liquid to be filtered as a body feed. Each particle of the filter aid has a specific surface of less than $1.03.10^6$ $m^2/m^3$, the particles have an average diameter of from about 39.4 μm. According to said embodiment of the present invention, the 10% pass diameter of the filter aid particles is about 26.4 μm and the 80% pass diameter is about 48.78 μm. In addition, the particles of the filter aid have a shape factor, defined as the ratio of the smallest diameter of the particle to the largest diameter of the particle of about 0.84. Accordingly, the particles may be characterized as angular. According to said embodiment of the present invention, the specific mass of the filter aid is about 1030 kg/m$^3$, which is 103% of the specific mass of the suspension to be filtered. In addition, the particles are isotropic.

The method of the present invention, according to said first embodiment, produces a filter cake having a specific resistance to flow that is less than the specific resistance of known filter aids, such as diatomaceous earth and spherical beads. According to said embodiment of the method of the present invention, the described filter aid is added to unfiltered beer in a process of alluviation. According to said embodiment of the present invention, the filter aid and solids filtered from beer form a filter cake having a specific resistance of about $4.63.10^9$ m/kg.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease, and/or reducing cost of implementation. The present invention includes items which are novel, described in terminology adapted from previous and/or analogous technologies, for convenience in describing novel items or processes, but do not necessarily retain all aspects of conventional usage of such terminology.

The foregoing discussion of the invention has been presented for purposes of illustration and description. The foregoing is not intended to limit the invention to the form or forms disclosed herein. Although the description of the invention includes description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable, and/or equivalent structures, functions, ranges or steps to those claimed, whether or not such alternate, interchangeable, and/or equivalent structures, functions, ranges or steps are disclosed herein, and without intending to publicly dedicate any patentable subject matter.

What is claimed is:

1. A method for filtering an unfiltered liquid, comprising the steps of: providing a filter aid having a population of individual angular particles, said particles being defined by a shape factor of from about 0.6 to about 0.85, and said population of angular particles being defined by a uniformity coefficient D80/D10 of from 1.8 to about 5; adding said filter aid to said unfiltered liquid in order to have a suspension; and filtering said suspension on a filter, thereby forming on a surface of said filter, a filter cake comprising said filter aid and particles filtered from said suspension.

2. The method for filtering an unfiltered liquid of claim 1, wherein said individual angular particles have a specific mass of less than or equal to 125% of the specific mass of the suspension to be filtered.

3. The method for filtering an unfiltered liquid of claim 1, wherein said individual angular particles have an isotropic physical nature.

4. The method for filtering an unfiltered liquid of claim 1, wherein said individual angular particles are formed from a polymer.

5. The method for filtering an unfiltered liquid of claim 4, wherein said polymer is a synthetic polyamide.

6. The method for filtering an unfiltered liquid of claim 1, wherein said individual angular particles are formed from glass.

7. The method for filtering an unfiltered liquid of claim 1, wherein said population of individual angular particles is defined by the fact that 70% of the individual particles have a diameter of between 15 and 50 μm.

8. The method for filtering an unfiltered liquid of claim 1, wherein the filter cake has a porosity between 0.5 and 0.7.

9. The method for filtering an unfiltered liquid of claim 1, wherein said filter cake has a permeability greater than 0.5 Darcy.

10. The method for filtering an unfiltered liquid of claim 1, wherein said liquid is beer.

11. A filter aid comprising a population of individual angular particles, wherein said particles being defined by a shape factor of from about 0.6 to about 0.85, and said population of angular particles being defined by a uniformity coefficient of from about 2 to about 5.

12. A filter aid, comprising: a plurality of angular particles, wherein each of said angular particles has a diameter, wherein each of said angular particles has a shape factor of between 0.6 and 0.85, wherein said plurality of angular particles has a uniformity coefficient comprising the ratio between said diameter of 80% of said angular particles and said diameter of 10% of said angular particles of between 1.8 and 5, and wherein each of said angular particles has a specific surface of less than $10^6$ m$^2$/m$^3$.

13. The filter aid of claim 12, wherein each of said angular particles included in said plurality of angular particles is isotropic.

14. The filter aid of claim 12, wherein each of said angular particles included in said plurality of angular particles is formed from a polymer.

15. The filter aid of claim 12, wherein each of said angular particles included in said plurality of angular particles is formed from glass.

16. The filter aid of claim 12, wherein at least 70% of said angular particles included in said plurality of angular particles has a diameter between 15 and 50 μm.

17. The filter aid of claim 12, wherein each of said angular particles included in said plurality of angular particles has a diameter of from about 30 to about 40 μm.

18. The filter aid of claim 12, wherein said plurality of angular particles comprises a cake having a porosity between 0.5 and 0.7 and a permeability of greater than 0.5 Darcy.

19. The method for filtering an unfiltered liquid of claim 1, wherein said population of individual angular particles is defined by the fact that 90% of the individual particles have a diameter of between 15 and 50 μm.

* * * * *